(12) United States Patent
Mauro et al.

(10) Patent No.: US 10,495,016 B2
(45) Date of Patent: Dec. 3, 2019

(54) METHOD, SYSTEM AND COMPUTER PRODUCT FOR EVALUATING THE QUANTITY OF PARTICULATE ACCUMULATED WITHIN A PARTICULATE FILTER OF A DIESEL ENGINE

(71) Applicant: FCA Italy S.p.A., Orbassano (Turin) (IT)

(72) Inventors: Alessandro Mauro, Turin (IT); Vincenzo Colandrea, Turin (IT); Danilo Garombo, Turin (IT)

(73) Assignee: FCA Italy S.P.A., Orbassano (Turin) (IT)

( * ) Notice: Subject to any disclaimer, the term of this patent is extended or adjusted under 35 U.S.C. 154(b) by 108 days.

(21) Appl. No.: 15/892,149

(22) Filed: Feb. 8, 2018

(65) Prior Publication Data

US 2019/0072050 A1    Mar. 7, 2019

(30) Foreign Application Priority Data

Sep. 5, 2017    (EP) .................................... 17189343

(51) Int. Cl.
  *F02D 41/24*    (2006.01)
  *F02D 41/02*    (2006.01)
  (Continued)

(52) U.S. Cl.
  CPC ..... *F02D 41/2409* (2013.01); *B01D 46/0063* (2013.01); *B01D 46/448* (2013.01);
  (Continued)

(58) Field of Classification Search
  CPC ............ B01D 2279/30; B01D 46/0063; B01D 46/448; B01D 46/46; F01N 2550/04;
  (Continued)

(56) References Cited

U.S. PATENT DOCUMENTS

2005/0166582 A1    8/2005  Gotou
2015/0369154 A1*  12/2015  Garombo ................ F01N 9/002
                                                              60/274
2017/0268450 A1*   9/2017  Nagaoka ................ F01N 3/0256

FOREIGN PATENT DOCUMENTS

EP            2963271 B1    1/2017

OTHER PUBLICATIONS

European Patent Office, Extended European Search Report for EP 17189343.1 dated Nov. 28, 2017, 5 pages.

* cited by examiner

*Primary Examiner* — Audrey K Bradley
*Assistant Examiner* — Anthony Ayala Delgado
(74) *Attorney, Agent, or Firm* — Heslin Rothenberg Farley & Mesiti P.C.; Victor A. Cardona, Esq.

(57) ABSTRACT

Particulate accumulation in a particulate filter in the exhaust line of an engine is calculated by an electronic engine control unit. When the estimated accumulated particulate mass exceeds a predetermined threshold, an automatic regeneration step of the filter is activated. An actual instantaneous burned particulate mass is calculated as a function of values indicative of the state of the filter. A temporary correction factor representing an error between a theoretical value and the actual value is calculated. The temporary correction factor is stored in a second map of correction factors, based on the engine operating conditions. During an accumulation step, the estimated instantaneous particulate mass, calculated according to the first map based on the operating conditions of the engine, is multiplied by a correction factor calculated according to the second map based on the operating conditions of the engine.

11 Claims, 7 Drawing Sheets

(51) Int. Cl.
*B01D 46/00* (2006.01)
*B01D 46/44* (2006.01)
*B01D 46/46* (2006.01)
*F01N 3/023* (2006.01)

(52) U.S. Cl.
CPC ............. *B01D 46/46* (2013.01); *F01N 3/023* (2013.01); *F02D 41/029* (2013.01); *F02D 41/0245* (2013.01); *F02D 41/2429* (2013.01); *B01D 2279/30* (2013.01); *F02D 2200/0812* (2013.01); *F02D 2200/101* (2013.01)

(58) Field of Classification Search
CPC ..... F01N 2900/0418; F01N 2900/0601; F01N 2900/1602; F01N 3/023; F01N 9/002; F01N 9/005; F01N 9/007; F02D 2041/1433; F02D 2200/0804; F02D 2200/0812; F02D 2200/101; F02D 41/0245; F02D 41/029; F02D 41/1467; F02D 41/2409; F02D 41/2429; F02D 41/2451

See application file for complete search history.

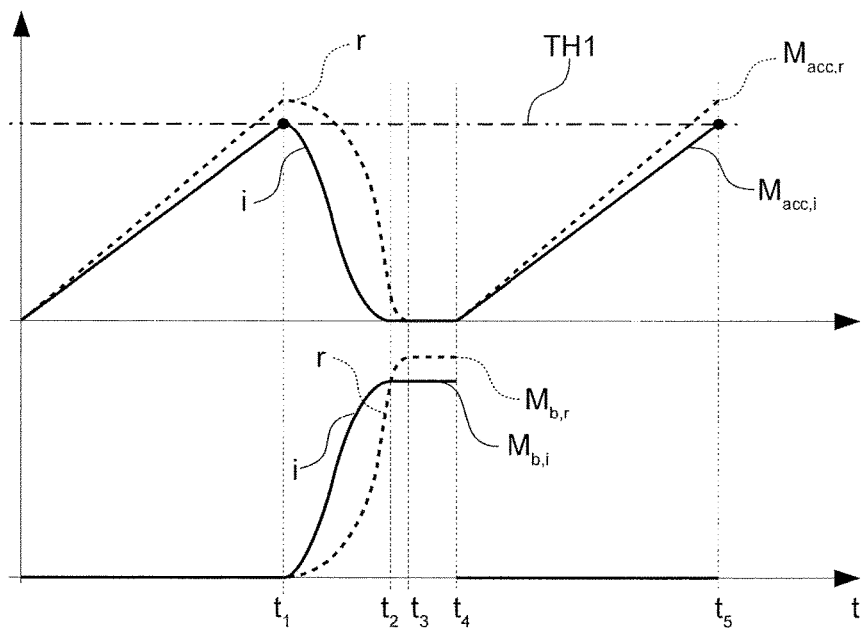
FIG.3A
FIG.3B
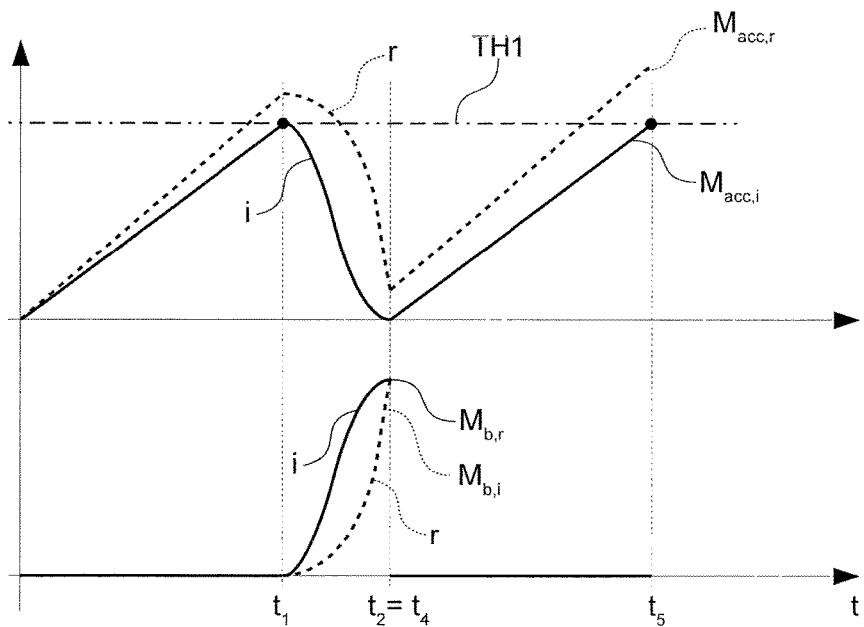
FIG.3C
FIG.3D

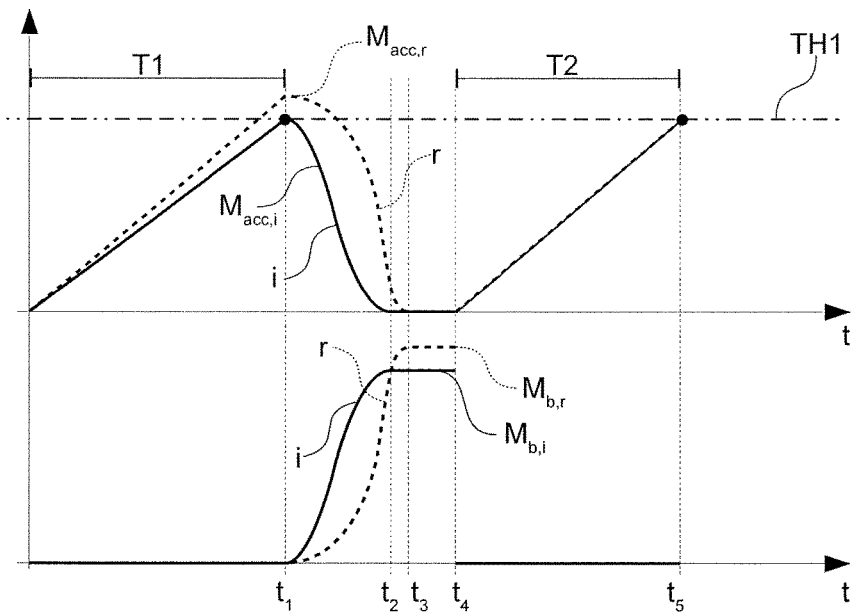
FIG.4A
FIG.4B
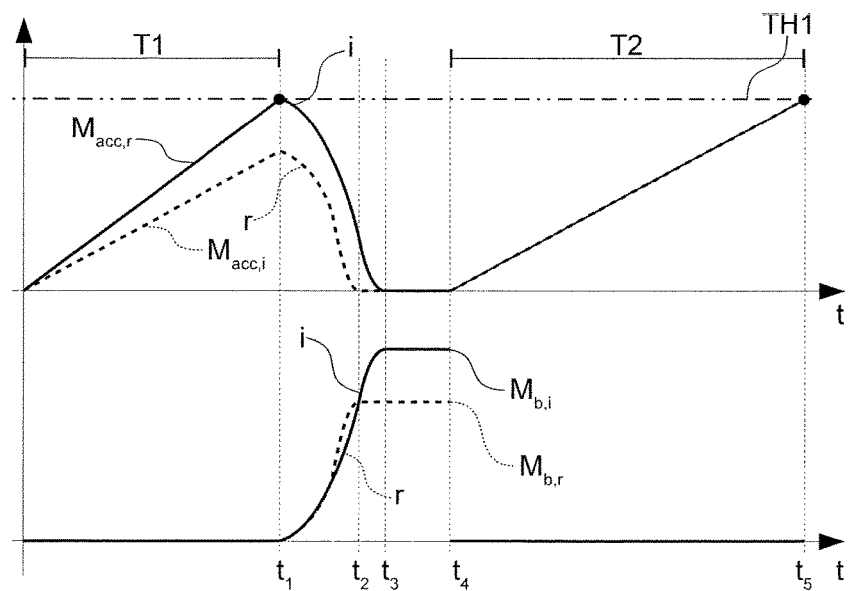
FIG.4C
FIG.4D

METHOD, SYSTEM AND COMPUTER PRODUCT FOR EVALUATING THE QUANTITY OF PARTICULATE ACCUMULATED WITHIN A PARTICULATE FILTER OF A DIESEL ENGINE

CROSS REFERENCE TO RELATED APPLICATIONS

This application claims priority to European Application No. 17189343.1, filed on Sep. 5, 2017, the entire disclosure of this application being hereby incorporated herein by reference.

FIELD OF THE INVENTION

The present invention relates to Diesel engines and particularly relates to a method for evaluating the quantity of particulate present in the particulate filter provided along the exhaust line of a Diesel engine.

PRIOR ART

Reducing particulate emissions from a Diesel engine is a key problem in order to meet current and future regulations relative to pollutant emissions. In order to comply with particulate emission limits, it is necessary to use exhaust gas treatment systems, particularly including a Diesel particulate filter (DPF) or trap, which acts as a mechanical barrier to prevent the passage of the particulate, thanks to the conformation of ceramic channels created inside it. The aforesaid trap is integrated into the exhaust line of the engine and is able to retain, therein, the particulate generated during the combustion process, with an efficiency close to 100%. Particulate accumulation on the filter surface does, however, increase the pressure at the exhaust of the engine, which causes a decrease in efficiency of the engine. Consequently, it is necessary to regenerate the trap, periodically, by ("light off") combustion of the particulate accumulated therein. To this end, the electronic engine control unit (ECU) of the fuel injectors associated with the cylinders of the engine is programmed to activate—when the estimated quantity of particulate accumulated in the filter exceeds a threshold value—an injector control mode, which causes an automatic regeneration of the filter by an increase in the temperature of the exhaust gases sent to the filter, sufficient to burn the particulate in the filter. This temperature increase is obtained, for example, by controlling multiple fuel injections in the combustion chamber during the exhaust step (post-injections) so as to introduce the partially burned fuel directly into the exhaust. This partially burned fuel, burning along the exhaust line, induces high temperatures in the DPF, allowing combustion of the accumulated particulate.

FIG. 1 of the attached drawings schematically shows the injection control system and the exhaust system of a modern Diesel engine. In this figure, reference numeral 1 indicates the engine, having a plurality of cylinders, each provided with an electromagnetic fuel injector 2 controlled by an electronic control unit E. Reference numeral 4 indicates the intake duct of the air, in which a flowmeter 5, a butterfly valve 6, an exhaust gas recirculation (EGR) valve 7 and a supercharging compressor 8 are interposed. The reference numeral 9 indicates, as a whole, the exhaust line of the engine in which the turbine 10 is interconnected, which is mechanically connected to the supercharging compressor 8, along with a pre-catalyst 11, the catalytic converter 12, and the particulate filter 13. Reference number 14 indicates the line for recirculating exhaust gases from the engine outlet to the EGR valve 7. A sensor 15 detects the pressure difference existing upstream and downstream of the particulate filter 13. The electronic control unit E receives signals leaving said sensor 15, from temperature sensors T5 and T6, associated with the exhaust gas treatment device, located upstream and downstream of the particulate filter 13, respectively, and from the flowmeter 5, and transmits control signals to the butterfly valve 6, to the EGR valve 7, and to the injectors 2. An example of such a system is EP 2963271 B1.

The electronic engine control unit E is able to activate an automatic regeneration mode of the filter, by controlling multiple fuel injections at each cycle of the engine, so as to temporarily bring the temperature of the exhaust gases sent to the filter 13 to a value not less than 600° C., which causes (light-off) burning of the particulate.

TECHNICAL PROBLEM

According to the prior art, the quantity of particulate present in the filter is evaluated by the electronic control unit using a statistical model or by using a map-based model, in which it is possible to evaluate the smokiness of the engine for each operating condition of the engine, for example, as a function of the engine revolutions and load required. For each operating condition of the engine and the vehicle, the control unit performs, for example, on the basis of a map, an estimate of a specific accumulation in grams per hour (g/h) of particulate ("soot-loading") in the filter, which is based on average statistical readings.

The disadvantage of this known solution is that it can give rise to an estimate that is relatively far from the actual value. Particulate emission, in fact, depends on many different factors such as, for example, the positioning in time of the injections, the percentage of exhaust gas recirculation (EGR), and the type of injectors. Calibration of an engine must be performed with values of the various parameters in play corresponding to the mean values of the respective variation bands, i.e. corresponding exactly to the project specifications. However, due to tolerances in the manufacturing of the different components, the various parameters can vary widely, with a Gaussian distribution, between maximum and minimum values for each component.

In a "worst-case" scenario, an engine can have all "uncalibrated" injectors, which inject a larger amount of fuel than that predicted by the electronic control unit, so that the engine will have a greater smokiness compared to an engine with "ideal" injectors, which inject an amount of fuel corresponding to the project value. The overlapping of the effects of all these components that deviate from the ideal condition, even when each component remains within the maximum dispersion allowed by the manufacturing tolerances, can have the effect of increasing the smokiness of the engine.

The statistical model used in known systems operates in "open-loop" mode, and is therefore unable to take into account component dispersions and possible malfunctions, which can occur during the life of the motor-vehicle. In practice, the statistical model assigns, for example, to n motor-vehicles engaged in an "urban" cycle, the same urban "mission profile", assuming that in such a condition, the soot-loading in g/h is unique and predetermined for all motor-vehicles, regardless of the specific characteristics of each of them.

In addition to this, because of post-fuel injections, the regeneration step, on one hand, allows a rapid rise of the exhaust temperatures but, on the other, it tends to deteriorate the lubricating oil and increase the fuel consumption. For these reasons, both the frequency and the duration of the regeneration steps should not exceed the values strictly necessary for the correct and complete combustion of the particulate accumulated inside the filter.

These statistical models, therefore, must be calibrated by the manufacturer in such a way as to safeguard the integrity of the engine and its components, even in the worst-case scenario, i.e. in the case in which the deviations from the project condition of the individual components involve a more onerous situation for the engine. This allows the vehicle to have conditions that are as critical as possible for regenerating the complete emptying of the filter, avoiding a progressive and gradual clogging of the filter itself.

These models must, therefore, be very conservative, in order to avoid problems for the widest possible range of vehicles. This results in a high frequency and duration of the regenerations, resulting in a waste of fuel and a faster deterioration of the engine oil quality.

OBJECT OF THE INVENTION

The object of the present invention is that of producing a Diesel engine equipped with a control system for regenerating the particulate filter based on a more accurate evaluation of the particulate accumulation in the filter, which allows the disadvantages discussed above to be overcome.

A further object of the invention is that of achieving the aforesaid objective with simple and inexpensive means.

SUMMARY OF THE INVENTION

In order to achieve the aforesaid objects, the invention relates to a method for controlling a Diesel engine system, of the type comprising a particulate filter interposed in the engine exhaust line, and an electronic engine control unit of one or more fuel injectors associated with the cylinders of the engine, wherein—when a particulate mass accumulated in the filter is estimated to be above a first predetermined threshold—an injector control mode is activated that causes the start of a step of automatic regeneration of the filter, by an increase in the exhaust gas temperature sent to the filter sufficient to burn the particulate in the filter, in which the accumulated particulate mass is calculated as the sum of theoretical instantaneous particulate masses, calculated as a function of a map based on operating conditions of the engine. The method of the present invention is characterized in that, during the regeneration step, it comprises:
  receiving values indicative of the state of the particulate filter,
  calculating, as a function of the indicative values of the state of the filter, an actual instantaneous burned particulate mass,
  summing the actual instantaneous burned particulate masses,
  calculating a correction factor based on the sum of actual instantaneous burned particulate masses and the sum of theoretical instantaneous particulate masses, in which the correction factor is representative of an estimation error between said theoretical value and said actual value, and
  storing the correction factor in an additional map based on the engine operating conditions.

The method is also characterized in that, during the accumulation step, it involves multiplying the theoretical instantaneous particulate mass calculated according to the map, by the correction factor calculated according to the additional map.

The invention also relates to a system as well as a computer-program product that can be loaded into the memory of at least one processing module (e.g., an electronic control unit of the engine) and including software code portions to carry out the steps of the method when the product is executed on at least one processing module. As used herein, the reference to such a computer-program product is intended to be equivalent to making reference to means readable by an electronic control unit of the engine or by a computer, containing instructions for controlling the processing system, in order to coordinate implementation of the method according to one or more embodiments. The reference to "at least one processing module" is intended to highlight the possibility of implementing one or more embodiments in a modular and/or distributed form.

DESCRIPTION OF THE FIGURES

Further characteristics and advantages of the invention will become apparent from the description that follows with reference to the attached drawings, provided purely by way of non-limiting example, wherein:

FIGS. 3A to 3D are examples of variations in time of masses accumulated and burned in a particulate filter of a system in which no control method according to the present invention is present, FIGS. 4A to 4D are examples of variations in time of masses accumulated and burned in a particulate filter of a system in which a control method according to the present invention is present.

DESCRIPTION OF AN EMBODIMENT

The basic idea of the present invention is to control the regeneration steps of the particulate filter, intervening both on their frequency and their duration.

Figure 1:
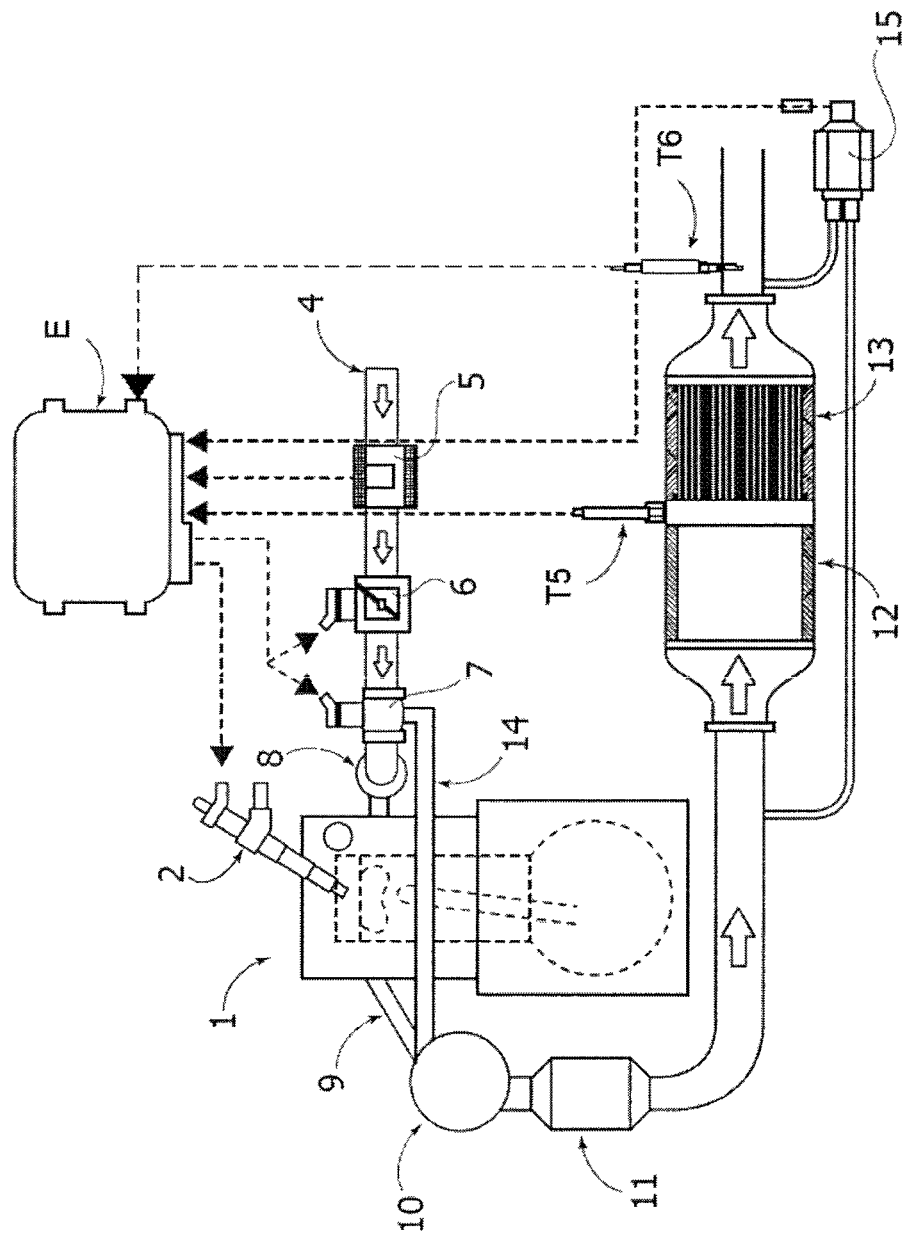
FIG. 1, already described above, schematically illustrates a Diesel engine of the type to which the present invention is applied.
Figure 2:
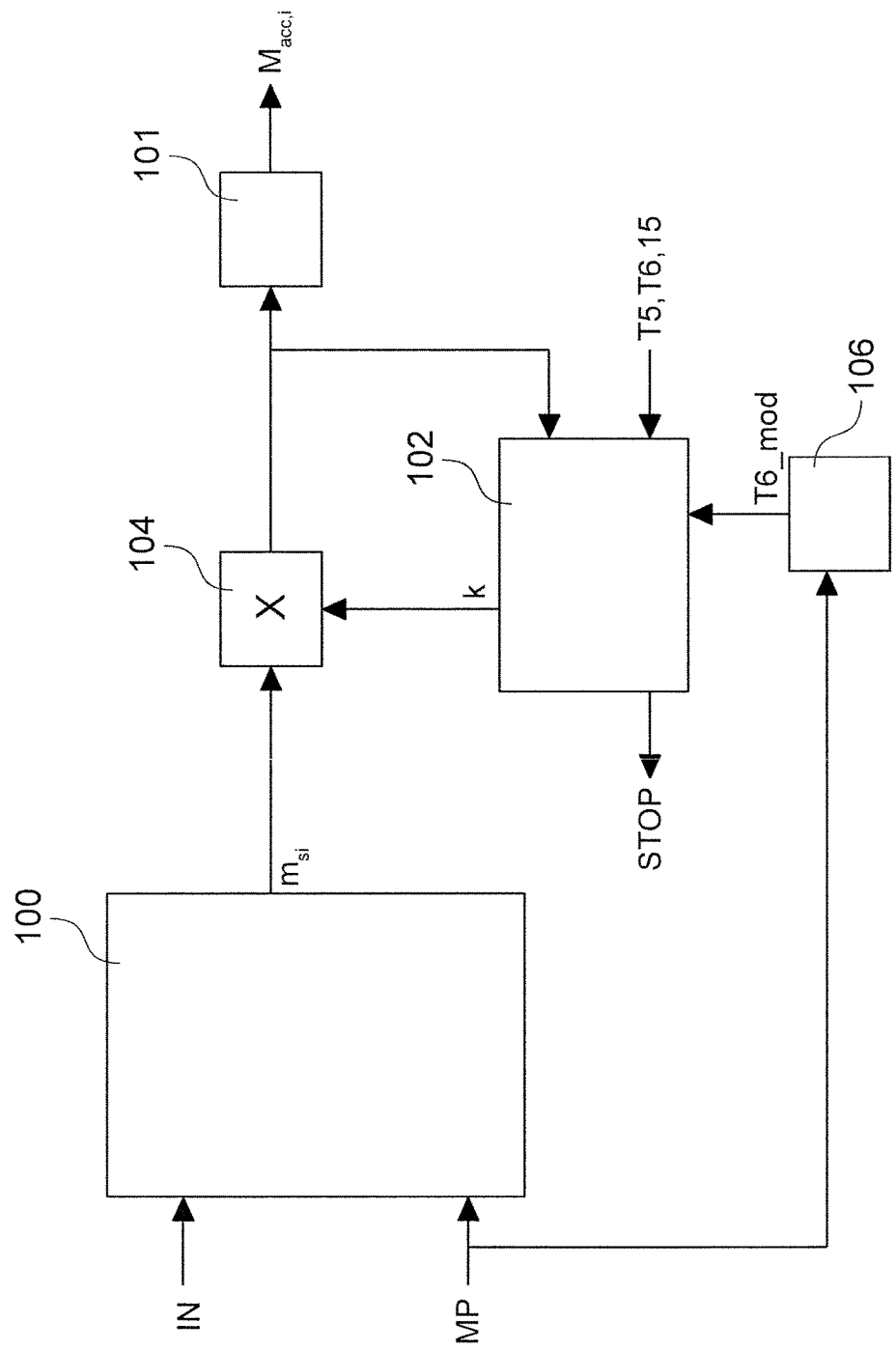
FIG. 2 is a block diagram showing the blocks necessary to carry out the operations whereby the electronic control unit according to the present invention is programmed.

FIG. 2 of the attached drawings is a block diagram showing the underlying principle of the present invention as implemented in the electronic control unit E of FIG. 1. Generally, the control unit E is programmed to activate an automatic regeneration of the particulate filter DPF when an estimated accumulated particulate mass $M_{acc,i}$ in the filter 13 reaches a predetermined level TH1. In the case of the prior art, this accumulated mass $M_{acc,i}$ is evaluated, as indicated above, exclusively by using an accumulation model 100, in which the control unit E calculates the accumulation in grams/hour (soot-loading) of the particulate in the filter 13, based on inlet values related to engine operating conditions, such as number of revolutions of the engine, engine load, lambda, ambient pressure, environmental temperature and engine water temperature, and/or a "Mission Profile" MP of the vehicle (for example "urban cycle", "extra-urban cycle", "mixed cycle"). The accumulation model 100 then outputs soot-loading information, i.e. on an instantaneous accumulated (particulate) mass $m_{si}$, which is then summed to other instantaneous accumulated masses in an integration block 101, generating the estimated accumulated mass $M_{acc,i}$. For example, as a function of the engine operating conditions (for example, mission profile MP), the accumulation model 100 can read on a map the corresponding value of instantaneous accumulated mass $m_{si}$ in the filter 13.

As already indicated, the operating mode of known systems does not allow a high precision of the estimate of the accumulation (soot-loading) of the particulate in the filter 13. Conversely, the system according to the invention, as exemplified in FIG. 2, still uses the statistical accumulation model 100 used in known systems, but also corrects, in a block 104, the information obtained with said statistical model 100, based on an analysis, performed in a combustion model 102, of exothermic processes that are determined during each regeneration step of the filter 13. In general, the combustion model 102 allows correction of the estimated instantaneous particulate mass $m_{si}$ at the output of the accumulation model 100 during the accumulation step, based on the analyses previously carried out during each regeneration step.

In particular, the regeneration frequency is controlled by correcting the accumulation model 100 by means of one or more correction factors k, determined on the basis of a map of correction factors k stored in a non-volatile memory of the control unit E.

During each single regeneration step, a temporary correction factor $k_{tmp}$ is calculated, and the map of correction factors k is updated based on the value of the temporary correction factor, as explained in more detail below.

The value of the instantaneous accumulated mass $m_{si}$ at the output of the accumulation model 100 can therefore be corrected, for example, by multiplying it, in the block 104, by the correction factor k determined on the basis of the map of correction factors k.

Calculation of the temporary correction factor $k_{tmp}$ can occur during each regeneration step, comparing the instantaneous accumulated masses $m_{si}$ evaluated by the accumulation model 100 with an actual burned (particulate) mass $M_{b,r}$ in the filter 13, calculated according to the combustion model 102 subject of the present invention.

The combustion model 102 has, as input data, in addition to instantaneous accumulated masses $m_{si}$, physical parameters, such as, for example, a flow rate of the exhaust gases passing through the filter DPF 13, a temperature of the exhaust gases immediately upstream of the filter T5, a temperature of the exhaust gases immediately downstream of the filter T6, an atmospheric temperature $T_{env}$, and a vehicle speed V. These values are conventionally acquired by sensors directly installed on the engine, such as the sensors T5, T6, and 15 shown in FIG. 1.

Another input data of the combustion model is a modeled temperature T6_mod outbound of, i.e. at the exit of, the DPF filter 13 obtained by means of a block 106 not subject of the present invention. This modeled temperature T6_mod is representative of a temperature outbound of—the DPF filter 13, i.e. a temperature T6 that the filter would have at its outlet during a regeneration step if there were no particulate combustion in the filter, being equal the values of the other input parameters. In the block 106, several models of this reference modeled temperature T6_mod can also be stored, depending on the different engine operating conditions.

Following each regeneration step, the calculated temporary correction factor $k_{tmp}$ is used to update the map of correction factors k, for example, it can be multiplied by one or more correction factors k stored in the map, so that after a certain number of regenerations, the product between these one or more correction factors k and the estimated instantaneous particulate mass $m_{si}$ from the accumulation model 100 allows accurate estimation of the actual quantities of particulate emitted by the engine. In this way, the value of an estimated accumulated (particulate) mass $M_{acc,i}$ can essentially correspond to the actual value of the accumulated (particulate) mass $M_{acc,r}$.

The combustion model 102 subject of the present invention therefore acts as a corrective feedback model with respect to the accumulation model 100 described above, allowing the electronic control unit E to adapt, on each vehicle, the particulate values calibrated by the manufacturer in the accumulation model 100.

The invention also allows these particulate values to be adapted during the life cycle of the vehicle, avoiding progressive clogging of the DPF 13, for example, because of deviations of the components due to their aging.

A further output from the combustion model 102 is a STOP signal, which allows interruption of the regeneration step if the need arises, for example, if an increase in time of the actual burned particulate mass $M_{b,r}$ is interrupted for a given period of time, a condition indicating the end of the particulate combustion step, which can take place before the end of the regeneration step.

FIGS. 3A and 3B illustrate the behavior, as a function of the time t, of the accumulated (particulate) mass $M_{acc}$ during the accumulation and burning step $M_b$ during the regeneration step, respectively, in the case in which this regeneration is too long or too short. Full lines represent estimated accumulated and burned masses, i, while dashed lines represent actual accumulated and burned masses, r. The present non-limiting example considers the possibility that the estimated accumulated mass is less than the actual value of the accumulated mass in the filter 13.

At an instant t=0, the particulate mass accumulation step begins in the filter 13. At every instant, the accumulation model 100 determines the instantaneous accumulated mass $m_{si}$, which, by summing together with the other instantaneous accumulated masses in the block 101, produces an essentially linear increase in the estimated particulate mass $M_{acc,i}$.

At the same time, the filter 13 actually fills with particulate, increasing, at each instant, the actual accumulated particulate mass $M_{acc,r}$. This actual mass may differ from the estimated mass for various reasons, for example, because the accumulation model 100, being unique to different vehicles, can be conservative and therefore can be designed to start a regeneration step before the particulate value actually reaches the threshold value TH1. A critical situation is that shown in FIGS. 3A to 3D, in which the actual accumulated mass can be greater than the estimated accumulated mass.

At an instant $t=t_1$, the estimated accumulated mass $M_{acc,i}$ reaches a threshold value TH1 indicating, for example, the value of the particulate mass that serves to fill the filter 13 to 100%, i.e. for completely filling the filter 13.

At that instant, then, the regeneration step begins and the accumulated mass $M_{acc}$ decreases, while the burned mass $M_b$ increases.

An instant $t=t_2$ is indicative of the moment in which the estimated accumulated mass $M_{acc,i}$ is entirely burned, in fact, the value of the estimated burned mass $M_{b,i}$ becomes constant.

Conversely, the actual accumulated mass $M_{acc,r}$, being greater than the estimated accumulated mass $M_{acc,i}$, is completely combusted at an instant $t_3 > t_2$, the time in which the actual regeneration of the filter 13 is obtained.

However, the programming of the control unit E envisages that the regeneration step continues until an instant $t_4$, leading to a superfluous prolongation of the regeneration step between instants $t_3$ and $t_4$. At the end of the regeneration step, a new accumulation step begins, which is interrupted at instant $t_5$, in which the estimated accumulated mass $M_{acc,i}$ again reaches the threshold value TH1.

Since the regeneration step is designed with a greater duration ($t_4 > t_3$) than the time needed to burn the actual accumulated mass $M_{acc,r}$, there is no improper mass accumulation, however, the excessive duration of the regeneration step can lead to a waste of fuel.

In FIGS. 3C and 3D, the references are the same as those used previously, and the difference lies in the fact that the duration of the regeneration coincides with the time that the estimated accumulated mass needs to burn completely, i.e. $t_2 = t_4$. As can be seen, unlike the case illustrated in FIG. 3B, where there is a period of time between instants $t_3$ and $t_4$, in which the burned masses are constant and, therefore, all the accumulated mass is combusted, in the case of FIG. 3D, the regeneration step ends before the mass accumulated in the filter 13 can be completely burned. This implies that, at the beginning of the subsequent accumulation step, there is a non-zero particulate mass, leading to an error which, in the case of the prior art, cannot be corrected.

As a result, a short-lasting regeneration step prevents improper fuel consumption; however, an error in estimating the accumulated mass $M_{acc,i}$ could lead to incomplete combustion of particulate, and hence a possible degradation of the filter 13 over time.

FIGS. 4A to 4D exemplify the variation in time of estimated (i) and actual (r) accumulated $M_{acc}$ and burned $M_b$ masses, in the case in which the method of the present invention is applied. For simplicity, the first start of the vehicle is considered or, e.g. the start after a reset condition, in which the map of the correction factors k is preset with all unitary correction factors k.

In a first accumulation step, of duration T1, the estimated instantaneous masses $m_{si}$ are multiplied by a correction factor k, and integrated by increasing the estimated accumulated mass $M_{acc,i}$. Both the calculation of estimated instantaneous masses $m_{si}$ and the calculation of the correction factor k occur on the basis of maps, based in turn on the operating conditions of the vehicle.

As there are unitary values in the map of correction factors k, in the first accumulation step, the estimated accumulated mass $M_{acc,i}$ is not corrected. Once again, at time $t=t_1$, the estimated accumulated mass $M_{acc,i}$ reaches the threshold value TH1, and the regeneration step begins, similar to that previously described. In contrast to FIGS. 3A to 3D, during this step, the temporary correction factor $k_{tmp}$ is calculated, as a function of the estimated accumulated particulate mass $M_{acc,i}$ and the actual burned particulate mass $M_{b,r}$.

Once calculated, the temporary correction factor $k_{tmp}$ can be used to update the correction factor k values stored in the map. For example, the correction factor $k_{tmp}$ can be multiplied by the correction factor k value stored in the map at the position corresponding to the engine operating conditions during the accumulation step. In this case, the unitary correction factor k is simply replaced by the temporary correction factor value $k_{tmp}$. In other words, the method of the present invention includes updating at least one value of the map of correction factors k after each regeneration step, according to the operating conditions that occur in the engine during the accumulation step corresponding to the regeneration step in which the temporary correction factor $k_{tmp}$ is calculated.

In particular, in the case of FIG. 4A, the correction factor $k_{tmp}$ can have a value greater than 1, so that multiplying by the estimated instantaneous mass $m_{si}$ leads to a steeper slope of the estimated accumulated mass $M_{acc,i}$, to reflect the actual accumulated particulate mass $M_{acc,r}$.

However, this only occurs if, in the successive accumulation step, that is, at time $t=t_4$, the vehicle maintains the same operating conditions as the preceding accumulation step, i.e. of the period T1. Otherwise, the value of the temporary correction factor $k_{tmp}$ calculated during the regeneration step cannot affect the new accumulation step, and the estimation of the instantaneous accumulated mass $m_{si}$ is not corrected because it is multiplied by a unitary correction factor k.

Considering, however, the same operating conditions of the vehicle as the previous accumulation step, the correction factor k just stored is multiplied by the estimated instantaneous particulate mass $m_{si}$, leading to a correction of the estimated accumulated particulate mass $M_{acc,i}$ essentially closer to the actual value of accumulated particulate mass $M_{acc,r}$. In this way, if the actual accumulated particulate mass $M_{acc,r}$ is greater than the estimated accumulated particulate mass $M_{acc,i}$, then it is possible to reach the threshold TH1 in a shorter period of time T2 compared to the time elapsed without correction, i.e. T2<T1.

This correction therefore avoids particulate accumulation and controls the start of the regeneration step according to both the instantaneous accumulated mass $m_{si}$, at the output of the model 100 and the actual burned mass $M_{b,r}$, calculated by means of the combustion model 102.

In FIG. 4C, the case is considered in which where the actual particulate mass $M_{acc,r}$ is accumulated at a lower speed (in g/h) than that of the estimated mass $M_{acc,i}$. In this case, the regeneration step will produce a period of time, from time $t_2$, in which the actual burned mass $M_{b,r}$ becomes constant at time $t_4$ in which the regeneration step ends, wherein the regeneration step is superfluous, since the combustion has already finished. This condition is due to the fact that the regeneration step begins before the actual accumulated particulate mass $M_{acc,r}$ reaches the threshold value TH1.

In this case, during the regeneration step, the temporary correction factor $k_{tmp}$ is calculated with a value of less than 1, which at a subsequent accumulation step (if the same operating conditions of the engine are verified), can be multiplied by the values of the estimated instantaneous particulate mass $m_{si}$.

Consequently, the slope of the straight line of the estimated accumulated particulate mass $M_{acc,i}$ essentially corresponds to the slope of the actual accumulated particulate mass $M_{acc,r}$ and the duration of the new accumulation step will have a value T2, greater than the previous one, that is, the period of the corrected accumulation step will be greater than that based entirely on the accumulation model 100, T2>T1.

Thus, the frequency of the regeneration steps is controlled by correcting the estimated instantaneous accumulated particulate mass $m_{si}$, at the output of the accumulation model 100, multiplied by one or more correction factors k determined on the basis of the map, updated by the combustion model 102 following each regeneration step.

It can, therefore, be appreciated that using correction factors k depends on the operating conditions of the vehicle. As long as the engine is not operating, it is not possible to calculate a correction factor k, which will therefore remain unitary, that is, it will continue to maintain the value initially set. Consequently, the corrective combustion model 102 acts on the accumulation model 100 during the subsequent regeneration step relative to that in which the correction factor k is updated.

It will be appreciated that, for simplicity, in the preceding figures, the case is shown in which an entire accumulation step corresponds to a single engine operating condition. However, depending on the variation in the operating conditions of the engine, a different trend can be expected with respect to the linear trend shown here, for example, a linear increase with broken lines, or a generic increasing trend as a function of the time. Therefore, if different operating conditions of the engine occur during the same accumulation step, different correction factors k would also be used, corresponding to the different operating conditions of the engine.

Likewise, the temporary correction factors $k_{tmp}$ calculated during the regeneration step can be used to update one or more correction factors k corresponding to operating conditions of the engine that have been detected, and which occurred during the accumulation step.

Figure 5A:
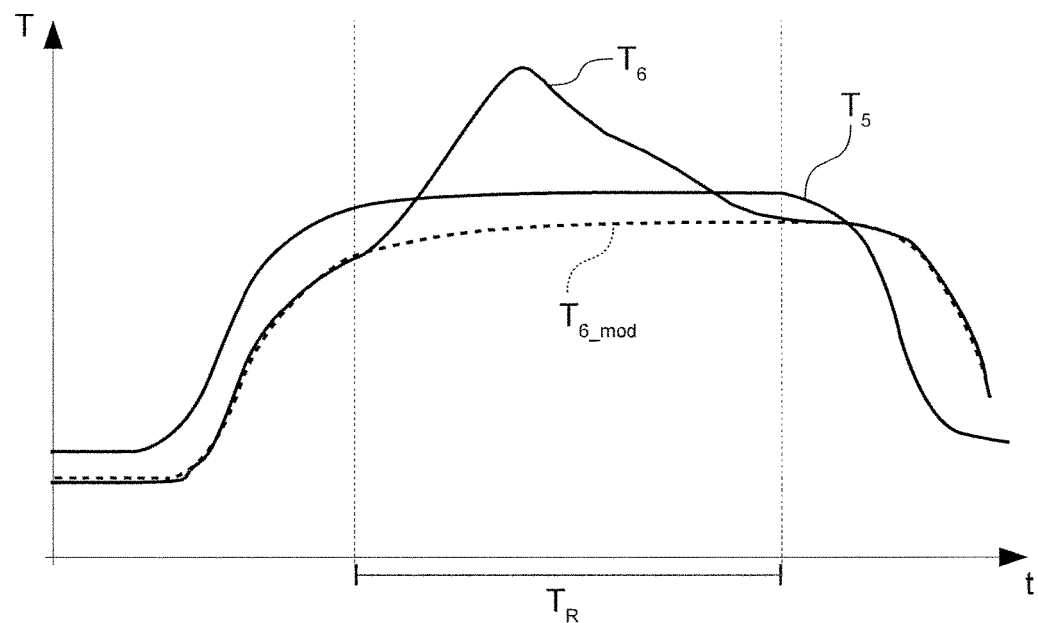
FIGS. 5A, 5B, 6A and 7A are examples of variations in time of the exhaust gas temperatures during the regeneration step of the filter, for example, in the case of an "empty" filter, i.e. without particulate, and in an actual case.
Figure 5B:
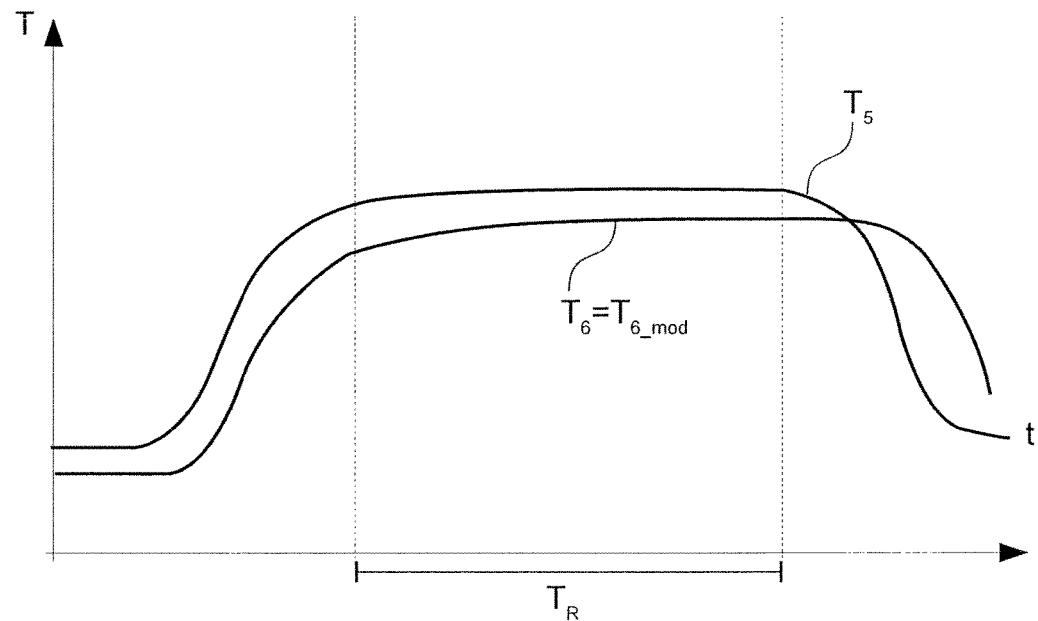

FIGS. 5A and 5B illustrate the variation in time of the temperatures, upstream T5, and downstream, T6, of the filter 13 during the regeneration step, respectively, in the presence and absence of burned particulate within it. The modeled temperature T6_mod, exemplified by a dashed line, is used as a reference.

As can be seen, in the case in which burned particulate is present inside the filter 13, the temperature downstream of the filter T6 is greater than that which would be downstream of the filter in the case in which there was no combustion during the regeneration step, T6_mod.

The two temperatures T6 and T6_mod, on the other hand, coincide outside the particulate combustion step, which in this non-limiting example coincides with the regeneration step $T_R$.

As exemplified in FIG. 5B, when there is no particulate accumulated in the filter 13, no combustion occurs and the two temperatures essentially coincide, even throughout the regeneration step $T_R$, T6=T6_mod.

In order to estimate the instantaneous burned particulate mass in the DPF 13, the principle of energy conservation can be applied to a control volume, using values obtained, for example, from the sensors T5, T6 and 15, and/or obtained from the block 106 for calculating the modeled reference temperature T6_mod.

By applying this principle of energy conservation to a filter 13 with accumulated particulate mass, in which combustion occurs during the regeneration step of the filter 13, the following is obtained:

$$(H_{exh,in-L}-H_{exh,out-L})*dt+P_{HC}*dt+P_{soot}*dt=dE_{brick-L}+P_{air-L}*dt \quad (1)$$

where $H_{exh,in-L}$ and $H_{exh,out-L}$ represent, respectively, inlet and outlet enthalpies from the exhaust gas filter, $P_{HC}$ represents a thermal power released by the combustion of unburned hydrocarbons, $P_{soot}$ represents a thermal power released by the particulate combustion, $dE_{brick-L}$ represents an infinitesimal increase at time dt of the internal energy of the filter, and $P_{air-L}$ represent a power transferred to the air by the filter due to convection.

The values of equation 1 can be calculated as follows:

$\dot{H}_{exh\ in-L}$ and $\dot{H}_{exh\ out-L}$ represent, respectively, an enthalpy change at the inlet and the outlet of the exhaust gas filter, calculated as:

$$\dot{H}_{exh\ in-L}=\dot{m}_{exh}*c_{P\ exh}*T_5$$

$$\dot{H}_{exh\ out-L}=\dot{m}_{exh}*c_{P\ exh}*T_6$$

where $\dot{m}_{exh}$ is a maximum flow through the particulate filter 13 received as an input to the model, and is available in the electronic control unit E; $c_{P\ exh}$ represents a specific heat at constant pressure of the gases (input to the model and calibrated in the electronic control unit E); furthermore, $T_5$ e $T_6$ represent the inlet and outlet gas temperatures at the particulate filter 13 (also included as inputs to the model and available in the electronic control unit E);

$P_{HC}$ represents the thermal power released by combustion of unburned hydrocarbons $$P_{HC}=\dot{m}_{HC}*H_{L\ HC}*\eta_{HC\ brick}$$

the terms of which are entered into the model and are available in the electronic control unit E, a detailed description will not be provided as they are not relevant to the present application;

Psoot represents the thermal power released by the combustion of the particulate $$P_{soot}=\dot{m}_{exh}*H_{L-soot}$$

where $H_{L-soot}$ represents the lower heating value of the particulate, input to the model and calibratable value in the electronic control unit E;

Pair-L is the power transferred to the air by the filter due to convection $$P_{air-L}=h_{air}*S_{brick}*(T_{brick}-T_{env})$$

where $h_{air}$ represents the brick/external environment thermal transmittance, $S_{brick}$ represents the surface of the brick, $T_{brick}$ and $T_{env}$ are, respectively, the average brick temperature and the environmental temperature, inputs to the model that are calibratable and/or available in the electronic control unit E;

dEbrick-L is the infinitesimal increase in time dt of the internal energy of the filter $$dE_{brick}=m_{brick}*c_{brick}*dT_{brick}(t)$$

where $m_{brick}$ represents the mass of the brick, $c_{brick}$ represents the specific heat of the brick, and $dT_{brick}$ represents the mean temperature variation inside the brick, inputs to the model that are calibratable/available in the electronic control unit E.

This equation refers to FIG. 5A, in which the downstream temperature of the filter 13 is T6.

The same principle of energy conservation can also be applied in the case of FIG. 5B, in which the downstream temperature of the filter 13 equals T6_mod:

$$(H_{exh,in-E}-H_{exh,out-E})*dt+P_{HC}*dt+P_{soot}*dt=dE_{brick-E}+P_{air-E}*dt \quad (2)$$

By subtracting the two equations member-by-member, we obtain an estimate of the thermal power instantaneously released by combustion of the particulate:

$$P_{soot}=(dE_{brick-L}-dE_{brick-E})/dt+(P_{air-L}-P_{air-E})+(H_{exh,out-L}-H_{exh,out-E}) \quad (3)$$

Similarly, by reordering equation 1, it is possible to obtain the thermal power instantaneously released by combustion of the particulate, as follows:

$$P_{soot}=dE_{brick-E}/dt+P_{air}-(H_{exh,in}-H_{exh,out})-P_{HC} \quad (4)$$

The difference between equation 3 and equation 4 is that the estimate of the instantaneously burned thermal power $P_{soot}$ according to equation 3 is more accurate since it is not necessary to take into account the thermal power due to the combustion of unburned particulate $P_{HC}$, more difficult to estimate. In addition, the terms that take into account the variation of internal energy and heat exchange with the external environment can be negligible compared to the term due to the exothermic process of the particulate. However, both equations can be used to obtain an estimate of the instantaneously burned particulate mass and, therefore, both can be used by the control unit E.

After estimating the thermal power released by combustion of the particulate $P_{soot}$, and once the lower heating value of the particulate $H_{L-soot}$ is known, it is possible to estimate the instantaneously burned particulate mass, $dm_{b,r}(t)$, as the ratio between the two values: $dM_{b,r}(t)=P_{soot}/H_{L-soot}$.

By integrating the instantaneously burned particulate mass $dM_{b,r}(t)$ during the regeneration step, it is possible to obtain an estimate of the actual burned particulate mass $M_{b,r}$ inside the DPF 13.

Figure 6A:
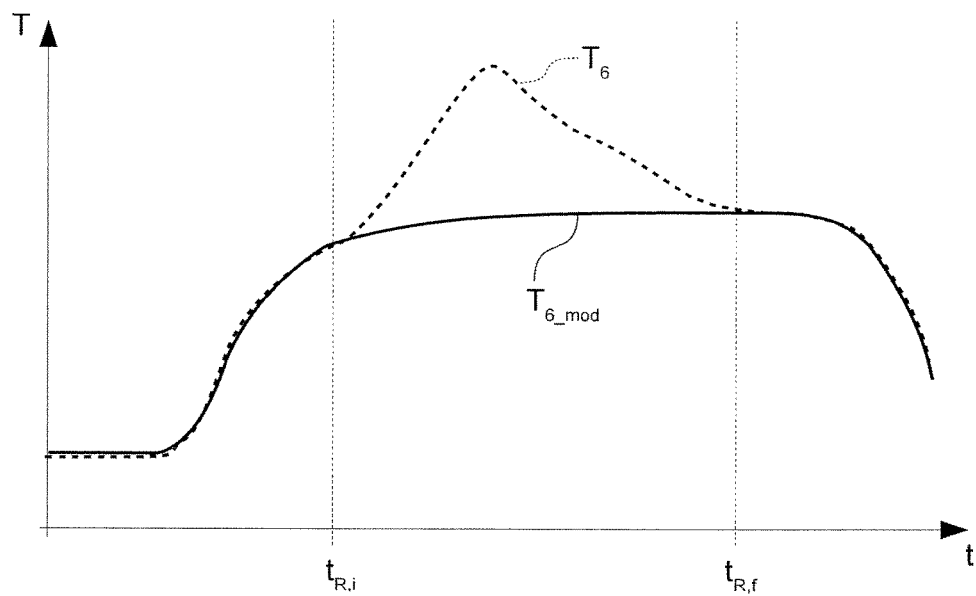
Figure 6B:
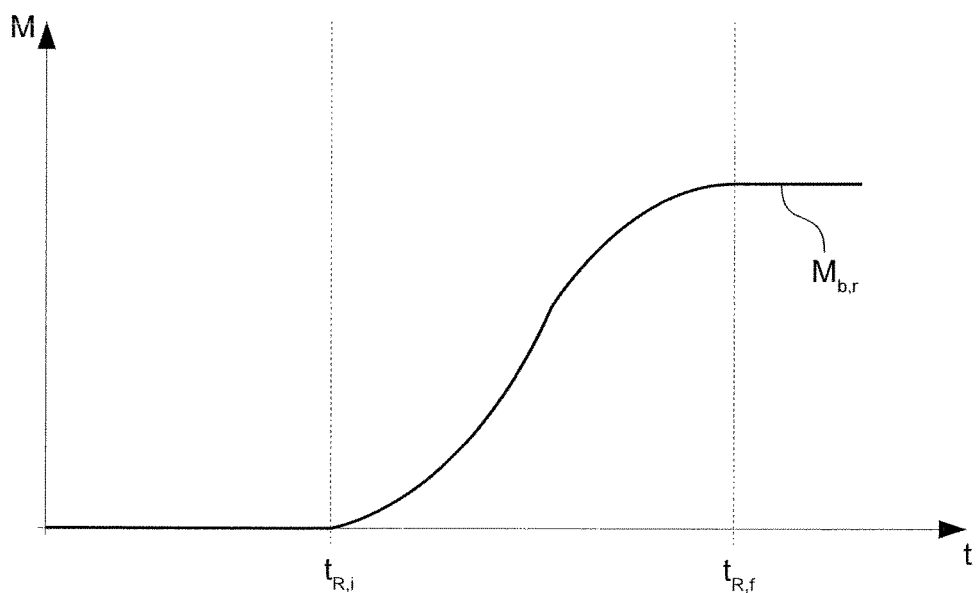
FIGS. 6B and 7B show the variation in time of particulate masses burned during a regeneration step.

FIGS. 6A and 6B are examples of the variations in time of the actual burned particulate mass $M_{b,r}$, with respect to the variation in the temperatures T6 (here exemplified by a dashed line) and T6_mod. When the two temperatures essentially cease to correspond, at a time $t_{R,i}$ combustion of the accumulated particulate mass begins, which ends at time $t_{R,f}$ in which the two temperatures essentially correspond once more. It will be appreciated that, at this instant, the actual burned particulate mass $M_{b,r}$ becomes constant, since the totality of the accumulated particulate has been burned.

However, calculation of the actual burned particulate mass $M_{b,r}$ can be affected by any estimation errors of the reference modeled temperature T6_mod. An additive or subtractive corrective term of the modeled temperature ΔM_corr can therefore be taken into account.

Figure 7A:
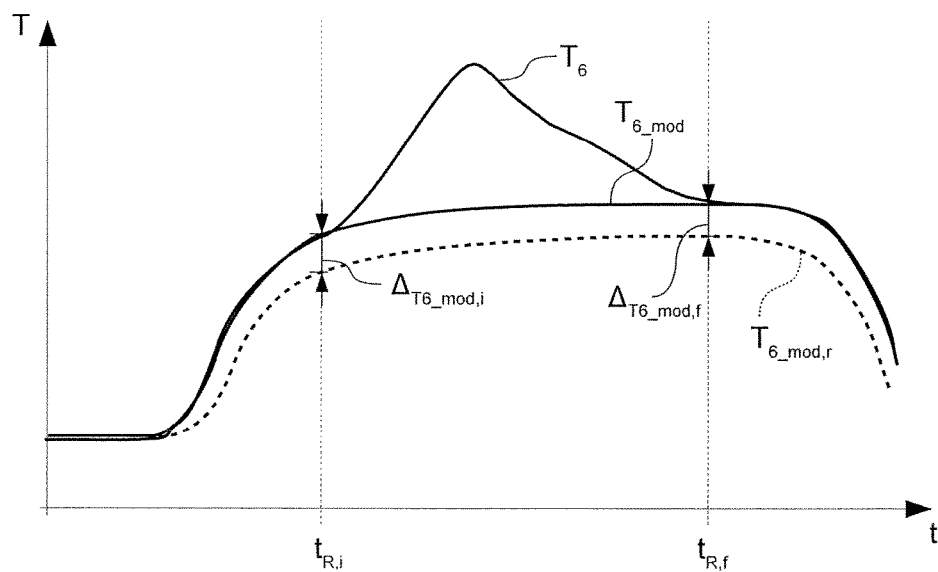

As can be seen in FIG. 7A, the modeled reference temperature T6_mod can have a real value T6_mod,r that is different from the ideal one, for example, due to an estimation error. The correction factor of the modeled temperature ΔM_corr can, therefore, be calculated according to the difference between the temperature downstream of the filter T6 and the actual modeled temperature T6_mod,r at times in which it is relatively certain that this difference is not due to the particulate combustion in the filter, but only due to errors caused by the model of the modeled temperature T6_mod. In other words, the correction factor of the modeled temperature ΔM_corr can be calculated as a function of a difference ΔT6_mod,i during the start of the regeneration step, at a time $t_{R,i}$ (when conditions that trigger the start of the particulate combustion have not yet been reached) and a difference ΔT6_mod,f during the final regeneration step, at a time $t_{R,f}$ (during which it is relatively certain that the previously accumulated particulate has already been completely oxidized, that is, the combustion step is over).

The correction factor of the modeled temperature ΔM_corr is then calculated as:

$$\Delta M_{corr} = c_{p,exh} * M_{exh} * \frac{(\Delta T6_{mod}, i + \Delta T6_{mod}, f)}{2} * \frac{1}{H_l} \quad (5)$$

wherein:

ΔT6_mod,i represents the difference between the temperature downstream of the filter T6 and the actual modeled temperature T6_mod,r at the initial moment of the regeneration step $t_{R,i}$, ΔT6_mod,f represents the difference between the temperature downstream of the filter T6 and the actual modeled temperature T6_mod,r at the final moment of the regeneration step $t_{R,f}$, $M_{exh}$ represents a mass of exhaust gases that has crossed the filter during the regeneration step, $C_{p,exh}$ represents the specific heat of the exhaust gases, and $H_l$ represents the lower heating value of the particulate.

Equation 5, and therefore the calculation of the correction factor of the modeled temperature ΔM_corr enables correction of the value of the burned particulate mass $M_{b,r}$, for example, at time $t_{R,f}$ relative to the end of particulate combustion.

The correction factor ΔM_corr, summed to the burned particulate mass $M_{b,r}$, allows a corrected value to be obtained, which is used for calculating the temporary correction factor k_tmp.

Figure 7B:
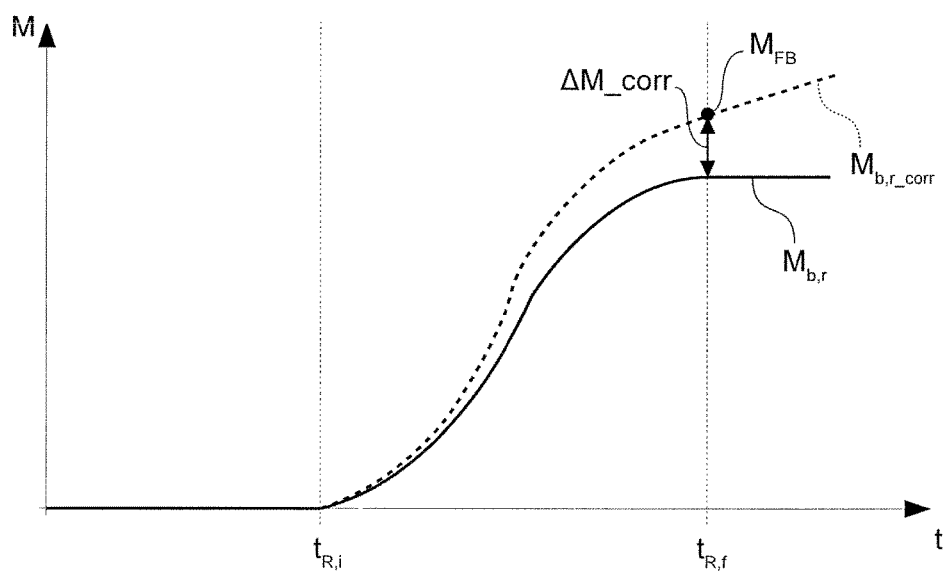

FIG. 7B shows the trend of the burned particulate mass $M_{b,r}$ and a corresponding corrected burned particulate mass $M_{b,r\_corr}$, that is, the trend in time that the burned particulate mass $M_{b,r}$ would have if there was no estimation error of the modeled temperature T6_mod. The corrected final value, calculated at time $t_{R,f}$ and exemplified in FIG. 7B with the reference $M_{FB}$, is used to correct the estimation of the accumulation model 100, as discussed above.

As can be seen from the variation of the corrected mass and the variation of the theoretical mass, the estimation error of the modeled temperature T6_mod can distort the estimate of the combusted particulate mass $M_{b,r}$, which can be improved by correcting the model by means of the correction factor of the modeled temperature ΔM_corr.

In various embodiments, it is possible to configure the combustion model 102 so that it also controls the duration of the regenerative steps, as well as the frequency, that is, making it possible to adjust the duration of the regeneration steps essentially to the time needed for the correct and complete combustion of the accumulated particulate $M_{acc}$ in the particulate filter DPF 13. Interruption of the regeneration can take place, for example, by means of a STOP signal, which can force the interruption of the current regeneration step. Duration of the regeneration step is corrected by allowing the system to manage the end of the current regeneration step when certain operating conditions of the filter DFG 13 are detected during the regeneration step itself. Duration of the regeneration step can therefore be modified while the same regeneration step is in progress.

In general, interruption of the regeneration step may be required after a certain period of time has elapsed, for example, a minimum time period considered empirically necessary to obtain correct combustion of the particulate in the filter 13.

The conditions that can lead to interruption of the regeneration step may be varied, and each one can allow interruption of the regeneration step, on its own, if it remains valid for a certain time, for example:

the quantity of instantaneously burned particulate matter (dMb,r(t)) falls below a threshold value: this indicates that there is no longer combustion in the filter 13 and, therefore, an additional extension of the regeneration step would only have the effect of increasing fuel consumption and increasing engine oil degradation, and/or a derivative in time of the difference between the temperature downstream of the filter T6 and the modeled temperature T6_mod lies below a certain threshold value and, at the same time, the difference between the temperature downstream of the filter T6 and the modeled temperature T6_mod is not greater than a certain limit: this indicates that an exothermic process no longer occurs in the filter, since the temperature downstream of the T6 filter is aligned with the temperature that the filter would have if there were no particulate combustion inside it T6_mod.

This last condition of interrupting the regeneration step can be taken into account due to possible estimation errors of the modeled temperature T6_mod. If there is a non-zero error on the T6_mod, for example, ΔT6_mod,i or ΔT6_mod, f, the interrupting condition based on the cancellation of the quantity of instantaneously burned particulate matter (dMb, r(t)) would never occur, as there would always be a (wrong) difference between the temperature downstream of the T6 filter and the modeled temperature T6_mod; it would be interpreted by the combustion model 102 as thermal release due to the particulate oxidation.

Of course, the details of construction and the embodiments can be widely varied with respect to those described and illustrated, purely by way of example, without thereby departing from the scope of the invention as defined by the claims that follow.

What is claimed is:

1. A method for controlling a Diesel engine system, comprising a particulate filter interposed in the exhaust line of the engine, and an electronic engine control unit for controlling a plurality of fuel injectors associated with the cylinders of the engine, wherein—when an estimated accumulated particulate mass in said filter reaches a predetermined threshold—a control mode of the injectors is activated, which causes the start of an automatic regeneration step of the filter, by an increase in the temperature of the exhaust gases sent to the filter sufficient to burn the particulate in the filter, said estimated accumulated particulate mass being calculated as the sum of estimated instantaneous accumulated particulate masses calculated according to a first map based on engine operating conditions, wherein, during said regeneration step, the method comprises:
  receiving values indicative of the state of the particulate filter,
  calculating, as a function of said values indicative of the state of the filter, an actual instantaneous burned particulate mass,
  summing the actual instantaneous burned particulate masses,
  calculating a temporary correction factor as a function of said sum of actual instantaneous burned particulate masses and of said sum of estimated instantaneous accumulated particulate masses, the temporary correction factor being representative of an error between said theoretical value and said actual value,
  updating at least one correction factor, included in a second map, as a function of said temporary correction factor and engine operating conditions which have occurred during an accumulation step, and
during the accumulation step, multiplying said estimated instantaneous particulate mass, calculated according to said first map and said engine operating conditions, by a correction factor calculated according to said second map and said engine operating conditions.

2. The method according to claim 1, comprising storing a unitary value for each correction factor in said second map, following a reset or initial start of the electronic control unit.

3. The method according to claim 1, wherein the step of updating said at least one correction factor comprises multiplying the temporary correction factor by said at least one correction factor of the second map.

4. The method according to claim 1, wherein one or more values indicative of the state of the particulate filter are received by means of at least one of the following sensors:
  temperature sensor upstream of the filter, and/or
  temperature sensor downstream of the filter, and/or
  ambient temperature sensor, and/or
  sensor determining the engine speed, and/or
  sensor measuring a flow of exhaust gases through the filter.

5. The method according to claim 1, comprising interrupting the regeneration step if at least one of the following conditions is met for a given period of time:
  the actual instantaneous burned particulate mass is below a second predetermined threshold value, and/or
  a difference between a filter outlet temperature and a temperature that the filter would have if no combustion occurred is below a third predetermined threshold value, and a derivative of said difference lies below a fourth predetermined threshold value, said temperatures being included in the values indicative of the state of the particulate filter.

6. The method according to claim 5, wherein interrupting the regeneration step is possible if a period of time has elapsed, indicative of the time considered empirically necessary for obtaining particulate combustion in the filter.

7. The method according to claim 1, comprising correcting the sum of the actual instantaneous burned particulate masses, by summing a correction factor thereto, calculated as a function of the filter outlet temperature and the temperature that the filter would have if no combustion occurred.

8. The method according to claim 7, wherein the correction factor is calculated as a function of a mean between the differences, at the start and at the end of the regeneration, between the filter outlet temperature and the temperature that the filter would have if no combustion occurred.

9. The method according to claim 1, wherein the actual instantaneous burned particulate mass is calculated as a function of a thermal power released by the particulate combustion and a lower heating value of the particulate, preferably as the ratio between the thermal power released by the particulate combustion and the lower heating value of the particulate.

10. The method according to claim 9, wherein said thermal power released by the particulate combustion is calculated according to:
  values indicative of an infinitesimal increase in the internal energy of the filter, of the power transferred to the air by the filter due to convection, and of an enthalpy of the exhaust gases leaving the filter if combustion occurs, and if no combustion occurs, during the regeneration step, preferably as a function of a difference of said values, or
  values indicative of said infinitesimal increase of the internal energy of the filter within which no combustion occurs, of said power transferred to the air by the filter due to convection, of the thermal power released by combustion of the particulate and of a difference between said enthalpy of the exhaust gases leaving the filter and the enthalpy of the exhaust gases entering the filter.

11. A computer-program product loadable in the memory of at least one electronic control unit, and comprising software code portions for performing the steps of the method of claim 1.

* * * * *